United States Patent [19]

Tsuyama et al.

[11] Patent Number: 4,736,884

[45] Date of Patent: Apr. 12, 1988

[54] METHOD FOR MANUFACTURING HIGH-STRENGTH CLAD STEEL PLATE EXCELLENT IN CORROSION RESISTANCE

[75] Inventors: Seishi Tsuyama; Kazuaki Matsumoto; Masaharu Honda; Shigeyasu Matsumoto, all of Fukuyama; Akira Tagane, Kasaoka; Toru Izawa, Fukuyama, all of Japan

[73] Assignee: Nippon Kokan Kabushiki Kaisha, Tokyo, Japan

[21] Appl. No.: 879,219

[22] Filed: Jun. 27, 1986

[30] Foreign Application Priority Data

Jul. 15, 1985 [JP] Japan ................................ 60-154225

[51] Int. Cl.$^4$ ............................................. B23K 29/02
[52] U.S. Cl. ................................. 228/200; 228/263.15; 228/235
[58] Field of Search ............... 228/231, 263.15, 263.11, 228/200, 235

[56] References Cited

U.S. PATENT DOCUMENTS 3,393,445  7/1968  Ulam ............................. 228/263.15
3,615,920  10/1971  Talento ........................... 228/231

FOREIGN PATENT DOCUMENTS 59-72972  10/1985  Japan .
1445077   8/1976   United Kingdom ................ 228/235

OTHER PUBLICATIONS

Nippon Kokan Giho (Nippon Kokan Technical Report), No. 106, Jan. 31, 1985, pp. 12 and 13.

Primary Examiner—Nicholas P. Godici
Assistant Examiner—Karen Skillman
Attorney, Agent, or Firm—Frishauf, Holtz, Goodman & Woodward

[57] ABSTRACT

A method for manufacturing a high-strength clad steel plate excellent in corrosion resistance, which comprises the steps of: placing a cladding sheet comprising stainless steel onto at least one of the surfaces of a substrate sheet comprising any one of carbon steel and low-alloy steel; welding together the peripheries of the substrate sheet and the cladding sheet to prepare a slab; heating the prepared slab to a temperature of from 1,050° to 1,300° C.; hot-rolling the heated slab at a finishing temperature of at least 800° C. to obtain a clad steel plate comprising the substrate sheet and the cladding sheet; and cooling the obtained clad steel plate at a cooling rate of from 2° to 60° C. per second until the temperature of the clad steel plate is less than 450° C. The above-mentioned slab may be a composite slab prepared by: placing a first cladding sheet onto a first substrate sheet, applying a peeloff material onto the upper surface of the first cladding sheet, placing a second cladding sheet onto the first cladding sheet through the peeloff material therebetween, placing a second substrate sheet onto the second cladding sheet, and welding together the peripheries of the first and second substrate sheets through spacers.

8 Claims, No Drawings

METHOD FOR MANUFACTURING HIGH-STRENGTH CLAD STEEL PLATE EXCELLENT IN CORROSION RESISTANCE

PATENTS, APPLICATIONS AND PUBLICATIONS PERTINENT TO THE INVENTION

As far as we know, there are available the following documents pertinent to the present invention:

(1) Earlier Japanese Patent Application No. 72,972/84 filed on Apr. 13, 1984 which was published on Oct. 30, 1985; and (2) Nippon Kokan Giho (Nippon Kokan Technical Report), No. 106, Jan. 31, 1985, pages 12 and 13.

The contents of the above-mentioned earlier application and prior art document will be discussed hereafter under the heading of the "BACKGROUND OF THE INVENTION".

FIELD OF THE INVENTION

The present invention relates to a method for manufacturing a high-strength clad steel plate excellent in corrosion resistance.

BACKGROUND OF THE INVENTION

A clad steel plate is known, which ensures strength and toughness by means of a substrate sheet comprising any one of carbon steel and low-alloy steel, and ensures corrosion resistance by means of a cladding sheet comprising stainless steel.

A method for manufacturing a clad steel plate is disclosed in Nippon Kokan Giho (Nippon Kokan Technical Report), No. 106, Jan. 31, 1985, pages 12 and 13, which comprises the steps of:

placing a cladding sheet comprising stainless steel onto at least one of the surfaces of a substrate sheet comprising any one of carbon steel and low-alloy steel; welding together the peripheries of the substrate sheet and the cladding sheet to prepare a slab; heating the prepared slab to a temperature within the range of from 1,100 to 1,250° C.; and hot-rolling the heated slab at a finishing temperature of at least 1,050° C. to pressure-weld the substrate sheet and the cladding sheet together to obtain a clad steel plate comprising the substrate sheet and the cladding sheet (hereinafter referred to as the "prior art").

Although the above-mentioned prior art does not mention cooling of the clad steel plate obtained by hot-rolling, it is the usual practice to leave the clad steel plate to cool in the open air.

In the above-mentioned prior art, since the clad steel plate obtained by hot-rolling is left to cool in the open air, no improvement is available in strength of the substrate sheet. Strength of the substrate sheet is therefore low. There is no improvement either in corrosion resistance of the cladding sheet. Corrosion resistance of the cladding sheet is therefore inferior to that of a solution-treated stainless steel sheet.

In the prior art, the prepared slab may sometimes be heated to a temperature within the range of from 1,050° to 1,300° C., and the heated slab may sometimes be hot-rolled at a finishing temperature of at least 800° C. In this case also, there occur problems similar to those described above.

With a view to solving the above-mentioned problems in the prior art to improve strength of the substrate sheet or to improve corrosion resistance of the cladding sheet, the following methods for manufacturing a clad steel plate are now under study:

(1) A method which comprises, when heating and then hot-rolling a slab comprising a substrate sheet and a cladding sheet to pressure-weld the substrate sheet and the cladding sheet together, applying a substantial accumulated reduction to the slab within the temperature region not allowing recrystallization of austenite in carbon steel or low-alloy steel composing the substrate sheet, i.e., applying the so-called controlled rolling, to improve strength of the substrate sheet (hereinafter referred to as the "controlled rolling type method").

In the controlled rolling type method mentioned above, in order to improve strength of the substrate sheet by the controlled rolling, it is necessary to apply a very intensive accumulated reduction to the slab within the temperature region not allowing recrystallization of austenite in carbon steel or low-alloy steel, particularly within a low-temperature region of up to 850° C., and the finishing temperature of hot-rolling of the slab lowers accordingly. As a result, there takes place only insufficient reduction of the slab within a higher temperature region, as is required for ensuring pressure-welding of the substrate sheet and the cladding sheet. Furthermore, application of hot-rolling to the slab at a temperature of under 800° C. causes precipitation of chromium carbide from the structure of the cladding sheet in the case where the cladding sheet is of austenitic stainless steel, and precipitation of $\sigma$-phase from the structure of the cladding sheet in the case where the cladding sheet is of dual-phase stainless steel, thus resulting in deterioration of corrosion resistance of the cladding sheet. This deterioration of corrosion resistance of the cladding sheet tends to be accelerated even if the slab has been previously heated before the controlled rolling to a temperature sufficient to cause dissolution of chromium carbide, since the clad steel plate is left to cool in the open air after the controlled rolling and chromium carbide may be reprecipitated.

(2) Another method which comprises leaving a clad steel plate obtained by hot-rolling a slab comprising a substrate sheet and a cladding sheet to cool in the air, and then reheating the clad steel plate to subject same to a heat treatment for the main purpose of a solution treatment of the cladding sheet, so as to give desirable properties to the cladding sheet and the substrate sheet (hereinafter referred to as the "solution treatment type method").

In the solution treatment type method mentioned above, when selecting a reheating temperature for the heat treatment for the main purpose of the solution treatment of the cladding sheet with a view to improving corrosion resistance thereof, a very high reheating temperature such as 1,010° C. or higher would be required in order to dissolve chromium carbide into the structure of stainless steel composing the cladding sheet in the form of chromium. When heated to such a high temperature, the austenite grains in the structure of carbon steel or low-alloy steel composing the substrate sheet are abnormally coarsened, thus resulting in deterioration of toughness of the substrate sheet. On the other hand, when a reheating temperature for the heat treatment is selected mainly for improving strength and toughness of the substrate sheet, the selected temperature would be lower than the temperature for dissolving chromium carbide into the structure of the cladding sheet in the form of chromium, thus resulting in insufficient dissolution of chromium carbide, and hence in deterioration of corrosion resistance of the cladding sheet.

After all, in the solution treatment type method, it is inevitable to find out a point of compromise by selecting, as the reheating temperature for the heat treatment, an intermediate temperature between the reheating temperature for the heat treatment for improving corrosion resistance of the cladding sheet and the reheating temperature for the heat treatment for improving strength and toughness of the substrate sheet, and such a selection is in consequence unsatisfactory for improvement of corrosion resistance of the cladding sheet and improvement of strength and toughness of the substrate sheet.

A method for manufacturing a clad steel plate is described in the earlier Japanese Patent Application No. 72,972/84 filed on Apr. 13, 1984, which comprises the steps of:

placing a first cladding sheet comprising any one of austenitic stainless steel and dual-phase stainless steel onto a first substrate sheet comprising any one of carbon steel and low-alloy steel; applying a peeloff material onto the upper surface of the first cladding sheet; placing a second cladding sheet comprising any one of austenitic stainless steel and dual-phase stainless steel onto the first cladding sheet through the peeloff material therebetween; placing a second substrate sheet comprising any one of carbon steel and low-alloy steel onto the second cladding sheet; welding together the peripheries of the first substrate sheet and the second substrate sheet through spacers to prepare a slab; heating the prepared slab to a temperature of at least 1,050° C.; hot-rolling the heated slab within a temperature region of from 850° to 950° C. at an accumulated reduction rate of from 30 to under 80% and at a finishing temperature of at least 850° C. to pressure-weld the first substrate sheet and the first cladding sheet together, and simultaneously pressure-weld the second substrate sheet and the second cladding sheet together, to obtain simultaneously a first clad steel plate comprising the first substrate sheet and the first cladding sheet, and a second clad steel plate comprising the second substrate sheet and the second cladding sheet; cooling simultaneously the first clad steel plate and the second clad steel plate at a cooling rate of from 2° to 30° C. per second until the temperatures of the first clad steel plate and the second clad steel plate fall within the range of from 45° to 650° C., and leaving the first clad steel plate and the second clad steel plate to cool in the open air; and separating the first clad steel plate and the second clad steel plate from an interface applied with the peeloff material (hereinafter referred to as the "earlier application art").

In the above-mentioned earlier application art, cooling of the first clad steel plate and the second clad steel plate obtained by hot-rolling is carried out at a cooling rate of from 2° to 30° C. per second until the temperatures of the first clad steel plate and the second clad steel plate fall within a rather high temperature range of from 450° to 650° C., thus resulting in only a limited improvement in strength of the first substrate sheet and the second substrate sheet.

Although the above-mentioned earlier application art does not define the upper limit of the heating temperature of the prepared slab, the upper limit of the heating temperature of the slab is practically 1,300° C. The heated slab may sometimes be hot-rolled at a finishing temperature of at least 800° C. In this case, there also occur problems similar to those mentioned above.

Under such circumstances, there is a demand for the development of a method for manufacturing a high-strength clad steel plate excellent in corrosion resistance, in which a cladding sheet has a high corrosion resistance and a substrate sheet has a high strength, but a method for manufacturing a clad steel plate provided with such properties has not as yet been proposed.

SUMMARY OF THE INVENTION

An object of the present invention is therefore to provide a method for manufacturing a high-strength clad steel plate excellent in corrosion resistance, in which a cladding sheet has a high corrosion resistance and a substrate sheet has a high strength.

In accordance with one of the features of the present invention, there is provided a method for manufacturing a high-strength clad steel plate excellent in corrosion resistance, which comprises the steps of:

placing a cladding sheet comprising stainless steel onto at least one of the surfaces of a substrate sheet comprising any one of carbon steel and low-alloy steel; welding together the peripheries of said substrate sheet and said cladding sheet to prepare a slab; heating said prepared slab to a temperature within the range of from 1,050° to 1,300° C.; hot-rolling said heated slab at a finishing temperature of at least 800° C. to pressure-weld said substrate sheet and said cladding sheet together to obtain a clad steel plate comprising said substrate sheet and said cladding sheet; and cooling said clad steel plate;

characterized in that:

said cooling of said clad steel plate is carried out at a cooling rate of from 2° to 60° C. per second until the temperature of said clad steel plate becomes under 450° C.

There is also provided a method for manufacturing a high-strength clad steel plate excellent in corrosion resistance, which comprises the steps of:

placing a first cladding sheet comprising stainless steel onto a first substrate sheet comprising any one of carbon steel and low-alloy steel; applying a peel-off material onto the upper surface of said first cladding sheet; placing a second cladding sheet comprising stainless steel onto said first cladding sheet through said peeloff material therebetween; placing a second substrate sheet comprising any one of carbon steel and low-alloy steel onto said second cladding sheet; welding together the peripheries of said first substrate sheet and said second substrate sheet through spacers to prepare a slab; heating said prepared slab to a temperature within the range of from 1,050° to 1,300° C.; hot-rolling said heated slab at a finishing temperature of at least 800° C. to pressure-weld said first substrate sheet and said first cladding sheet together, and simultaneously pressure-weld said second substrate sheet and said second cladding sheet together, to obtain simultaneously a first clad steel plate comprising said first substrate sheet and said first cladding sheet, and a second clad steel plate comprising said second substrate sheet and said second cladding sheet; cooling simultaneously said first clad steel plate and said second clad steel plate; and separating said first clad steel plate and said second clad steel plate from an interface applied with said peeloff material;

characterized in that:

said cooling of said first clad steel plate and said second clad steel plate is carried out at a cooling rate of from 2° to 60° C. per second until the temperatures of said first clad steel plate and said second clad steel plate become under 450° C.

DETAILED DESCRIPTION OF PREFERRED EMBODIMENTS

From the above-mentioned point of view, we carried out extensive studies to develop a method for manufacturing a high-strength clad steel plate excellent in corrosion resistance, in which a cladding sheet has a high corrosion resistance and a substrate sheet has a high strength.

As a result, we obtained the following finding: When cooling a clad steel plate, which is obtained by hot-rolling at a finishing temperature of at least 800° C. and comprises a substrate sheet comprising any one of carbon steel and low-alloy steel and a cladding sheet comprising stainless steel, is carried out at a cooling rate of from 2° to 60° C. per second until the temperature of the clad steel plate becomes under 450° C., the austenitic structure of carbon steel or low-alloy steel composing the substrate sheet is prevented from transforming into ferrite structure, and transformation into bainitic structure or into martensitic structure is promoted, thus permitting remarkable improvement of strength of the substrate sheet. On the other hand, since the above-mentioned cooling enables to prevent precipitation of chromium carbide from the structure of stainless steel composing the cladding sheet, it is possible to eliminate deterioration of corrosion resistance of the cladding sheet caused by precipitation of chromium carbide, thus permitting improvement of corrosion resistance of the cladding sheet. As a result, it is possible to manufacture a high-strength clad steel plate excellent in corrosion resistance, in which the cladding sheet has a high corrosion resistance and the substrate sheet has a high strength.

The present invention was made on the basis of the above-mentioned finding. The method for manufacturing a high-strength clad steel plate excellent in corrosion resistance of the present invention is described below.

In the present invention, stainless steel includes austenitic stainless steel, dual-phase stainless steel, ferritic stainless steel and martensitic stainless steel. These stainless steels have a fundamental chemical composition consisting of: up to 0.1 wt. % carbon, up to 2 wt. % silicon, up to 5 wt. % manganese, from 6 to 50 wt. % nickel, from 10 to 30 wt. % chromium, up to 1 wt. % soluble aluminum, and the balance being iron and incidental impurities, and may contain additionally and optionally at least one of up to 2 wt. % titanium, up to 2 wt. % niobium, up to 4 wt. % copper and up to 10 wt. % molybdenum.

In the present invention, carbon steel and low-alloy steel include steel specified in JIS B-3601 as a material for the substrate sheet. When considering particularly weldability, strength and toughness of the substrate sheet, carbon steel should have a chemical composition consisting of: up to 0.20 wt. % carbon, from 0.05 to 0.70 wt. % silicon, from 0.20 to 3.00 wt. % manganese, up to 0.07 wt. % soluble aluminum, and the balance being iron and incidental impurities, and low-alloy steel should further contain, in addition to the chemical composition of carbon steel mentioned above, at least one of up to 0.20 wt. % niobium, up to 0.30 wt. % vanadium, up to 0.20 wt. % zirconium, up to 0.30 wt. % titanium, up to 0.10 wt. % tantalum, up to 0.002 wt. % boron, up to 1.5 wt. % molybdenum, up to 6 wt. % chromium, up to 1 wt. % copper, up to 10 wt. % nickel, up to 0.07 wt. % calcium and up to 0.07 wt. % magnesium.

In the present invention, a slab prepared by placing a cladding sheet comprising stainless steel onto at least one of the surfaces of a substrate sheet comprising any one of carbon steel and low-alloy steel, and welding together the peripheries of the substrate sheet and the cladding sheet, is heated to a temperature within the range of from 1,050° to 1,300° C. as in the prior art described above for the purpose of causing sufficient dissolution of chromium carbide into the structure of stainless steel composing the cladding sheet in the form of chromium. If the slab is heated to a temperature of under 1,050° C., it is impossible to manufacture a clad steel plate excellent in corrosion resistance of the cladding sheet even when the subsequent steps are the same as those in the present invention. The upper limit of the heating temperature of the slab should be 1,300° C. because heating to a temperature of over 1,300° C. does not bring about any merit and causes loss of thermal energy.

In the present invention, the thus heated slab is hot-rolled at a finishing temperature of at least 800° C. as in the prior art described above, and is not hot-rolled at a finishing temperature of under 800° C. for the following reason. If stainless steel composing the cladding sheet is hot-rolled in a temperature region of under 800° C., chromium carbide precipitates from the structure of stainless steel, and this leads to deterioration of corrosion resistance of the cladding sheet. Hot-rolling causes the substrate sheet and the cladding sheet to be pressure-welded together, and thus a clad steel plate comprising the substrate sheet and the cladding sheet is obtained.

In the present invention, the thus obtained clad steel plate is cooled at a cooling rate of from 2° to 60° C. per second until the temperature of the clad steel plate becomes under 450° C. for the following reason:

When the clad steel plate is cooled from a temperature of at least 800° C. to a temperature under 450° C. at a high cooling rate of from 2° to 60° C. per second, austenitic structure of carbon steel or low-alloy steel composing the substrate sheet is prevented from transforming into ferritic structure, and transformation into bainitic structure or into martensitic structure is promoted. It is therefore possible to largely improve strength of the substrate sheet. When the above-mentioned cooling is carried out only to a temparature of at least 450° C., bainitic structure or martensitic structure cannot be produced to a sufficient extent, thus resulting in a limited improvement in strength of the substrate sheet. With a cooling rate of under 2° C. per second also, strength of the substrate sheet cannot be sufficiently improved as in the case mentioned above. If the cooling rate is over 60° C. per second, improvement in strength of the substrate sheet reaches saturation, and in addition, it is difficult to conduct such a rapid cooling in terms of cooling facilities.

On the other hand, the above-mentioned cooling also improves corrosion resistance of the cladding sheet. More specifically, the precipitation of chromium carbide from the structure of austenitic stainless steel or dual-phase stainless steel takes place by slow cooling in a temperature region of at least 450° C. Therefore, when the cladding sheet comprises austenitic stainless steel or dual-phase stainless steel, cooling of the clad steel plate to a temperature under 450° C. at a high cooling rate of from 2° to 60° C. per second after the hot-rolling prevents precipitation of chromium carbide, and hence prevents deterioration of corrosion resistance of the cladding sheet caused by precipitation of chromium carbide, thus resulting in a higher corrosion resistance of the cladding sheet. When the cladding sheet comprises ferritic stainless steel or martensitic stainless steel, the above-mentioned cooling also improves corrosion resistance of the cladding sheet, although to a smaller extent than in the case of austenitic stainless steel or dual-phase stainless steel. If the above-mentioned cooling is carried out only to a temperature of at least 50° C., corrosion resistance of the cladding sheet cannot be sufficiently improved. With a cooling rate of under 2° C. per second also, corrosion resistance of the cladding sheet cannot be sufficiently improved as in the case mentioned above. If the cooling rate is over 60° C. per second, improvement in corrosion resistance of the cladding sheet reaches saturation.

In the above description, the cooling rate of from 2° to 60° C. per second means an average cooling rate between 800° and 450° C. of the temperature of the clad steel plate. Cooling includes, in addition to ordinary water cooling with cooling water, mist cooling with cooling water in the form of mist and cooling with an ejected gas.

When the substrate sheet of the clad steel plate is required to have a high toughness, a heat treatment for improving toughness may be applied to the clad steel plate following the above-mentioned cooling. More specifically, in order to increase toughness of the substrate sheet with the slightest decrease in strength of the substrate sheet and in corrosion resistance of the cladding sheet, it suffices to subject, following the above-mentioned cooling, the clad steel plate to a heat treatment comprising: heating the clad steel plate to a temperature of at least 500° C. and under $A_{c1}$ point of the substrate sheet, and then cooling the heated clad steel plate at a cooling rate within the range of from 0.2° to 60° C. per second until the temperature of the clad steel plate reaches the room temperature.

The above description has covered the case of manufacture of only one clad steel plate which comprises a substrate sheet comprising any one of carbon steel and low-alloy steel, and a cladding sheet comprising stainless steel.

It is also possible to simultaneously manufacture two clad steel plates under the same manufacturing conditions as those described above from a slab prepared by: placing a first cladding sheet comprising stainless steel onto a first substrate sheet comprising any one of carbon steel and low-alloy steel; applying a peeloff material onto the upper surface of the first cladding sheet; placing a second cladding sheet comprising stainless steel onto the first cladding sheet through the peeloff material therebetween; placing a second substrate sheet comprising any one of carbon steel and low-alloy steel onto the second cladding sheet; and welding together the peripheries of the first substrate sheet and the second substrate sheet through spacers.

More particularly, the thus prepared slab is heated to a temperature within the range of from 1,050° to 1,300° C. The heated slab is hot-rolled at a finishing temperature of at least 800° C. to pressure-weld the first substrate sheet and the first cladding sheet together, and simultaneously pressure-weld the second substrate sheet and the second cladding sheet together, to obtain simultaneously a first clad steel plate comprising the first substrate sheet and the first cladding sheet, and a second clad steel plate comprising the second substrate sheet and the second cladding sheet. Then, the first clad steel plate and the second clad steel plate are simultaneously cooled at a cooling rate of from 2° to 60° C. until the temperatures of the first clad steel plate and the second clad steel plate become under 450° C. Subsequently, the first clad steel plate and the second clad steel plate are separated from an interface applied with the peeloff material.

When the substrate sheets of both the first clad steel plate and the second clad steel plate are required to have a high toughness, the first and second clad steel plates may be subjected, following the above-mentioned cooling, to a heat treatment for improving toughness comprising: heating the first and second clad steel plates to a temperature of at least 500° C. and under $A_{c1}$ point of the substrate sheets of the first and second clad steel plates, and then cooling same at a cooling rate within the range of from 0.2° to 60° C. per second until the temperatures of the first and second clad steel plates reach the room temperature. The above-mentioned heat treatment conditions are the same as those in the case described above where only one clad steel plate is manufactured.

EXAMPLES

In accordance with the method of the present invention, clad steel plates of the present invention Nos. 3, 5, 7, 9, 10, 11, 12, 14 and 15, each comprising a substrate sheet and a cladding sheet, were manufactured. For comparison purposes, clad steel plates for comparison Nos. 1, 2, 4, 6, 8 and 13, each comprising a substrate sheet and a cladding sheet, were manufactured under manufacturing conditions outside the scope of the present invention. Two clad steel plates were manufactured for each of the clad steel plates of the present invention Nos. 7, 9 and 10 and the clad steel plates for comparison No. 8 in accordance with the method for simultaneously manufacturing two clad steel plates described above.

The chemical compositions of the substrate sheets "A" to "G" used are shown in Table 1, and the chemical compositions of the cladding sheets "a" to "h" used are shown in Table 2. The manufacturing conditions of the above-mentioned clad steel plates are shown in Table 3.

TABLE 1

| Symbol | Substrate sheet | Chemical composition (wt. %) | | | | | | | | | | | | | |
|---|---|---|---|---|---|---|---|---|---|---|---|---|---|---|---|
| | | C | Si | Mn | P | S | Cu | Ni | Cr | Mo | Nb | V | Ti | B | Sol. Al | Others |
| A | Si—Mn Steel | 0.13 | 0.32 | 1.28 | 0.015 | 0.004 | — | — | — | — | — | — | — | — | 0.042 | — |
| B | Si—Mn steel | 0.16 | 0.35 | 1.37 | 0.013 | 0.004 | — | — | — | — | — | — | — | — | 0.031 | — |
| C | Cu—Ni—Nb—V steel | 0.06 | 0.32 | 1.52 | 0.008 | 0.002 | 0.31 | 0.15 | — | — | 0.032 | 0.038 | 0.01 | — | 0.027 | Ca: 0.002 Mg: 0.001 |

TABLE 1-continued (wt. %)

| Symbol | Substrate sheet | Chemical composition | | | | | | | | | | | | | |
|---|---|---|---|---|---|---|---|---|---|---|---|---|---|---|---|
| | | C | Si | Mn | P | S | Cu | Ni | Cr | Mo | Nb | V | Ti | B | Sol. Al | Others |
| D | low C—Nb steel | 0.04 | 0.23 | 1.56 | 0.009 | 0.001 | 0.24 | 0.12 | — | — | 0.34 | — | 0.01 | — | 0.025 | — |
| E | Ni—Cr—Mo—V—Ti—B steel | 0.10 | 0.28 | 1.03 | 0.006 | 0.001 | — | 0.45 | 0.53 | 0.21 | — | 0.042 | 0.008 | 0.0008 | 0.017 | — |
| F | Cu—Ni—Cr—Mo—V—Ti—B steel | 0.13 | 0.26 | 1.12 | 0.006 | 0.002 | 0.22 | 0.56 | 0.69 | 0.38 | — | 0.045 | 0.009 | 0.0007 | 0.024 | — |
| G | Cr—Mo steel | 0.10 | 0.22 | 0.49 | 0.006 | 0.004 | — | — | 2.14 | 0.99 | — | — | — | — | 0.012 | — |

TABLE 2

(wt. %)

| Symbol | Cladding sheet | Chemical composition | | | | | | | | | | | |
|---|---|---|---|---|---|---|---|---|---|---|---|---|---|
| | | C | Si | Mn | P | S | Cu | Ni | Cr | Mo | Nb | Ti | Sol.Al | Total N |
| a | SUS304 | 0.042 | 0.62 | 1.10 | 0.010 | 0.004 | — | 8.71 | 18.42 | 0.12 | — | — | 0.002 | 0.0575 |
| b | SUS304L | 0.025 | 0.56 | 0.98 | 0.012 | 0.003 | — | 10.25 | 18.77 | 0.16 | — | — | 0.004 | 0.0526 |
| c | SUS316L | 0.016 | 0.63 | 1.62 | 0.011 | 0.003 | — | 12.47 | 17.54 | 2.32 | — | — | 0.003 | 0.0462 |
| d | SUS329J1 | 0.017 | 0.49 | 1.03 | 0.015 | 0.002 | 1.42 | 5.52 | 23.41 | 2.86 | — | — | 0.043 | 0.0521 |
| e | Carpenter 20Cb3 | 0.023 | 0.67 | 0.84 | 0.024 | 0.001 | — | 33.68 | 19.86 | 2.21 | 0.68 | — | 0.132 | 0.017 |
| f | Incoloy 825 | 0.021 | 0.50 | 0.40 | 0.020 | 0.002 | — | 41.23 | 21.1 | 3.20 | — | 0.75 | 0.112 | 0.015 |
| g | SUS405 | 0.036 | 0.50 | 0.22 | 0.021 | 0.003 | — | — | 12.75 | — | — | — | 0.150 | 0.0132 |
| h | SUS410S | 0.045 | 0.51 | 0.18 | 0.020 | 0.004 | — | — | 12.86 | — | — | — | 0.005 | 0.0092 |

TABLE 3

| | No. | Substrate sheet | Cladding sheet | Thickness of substrate sheet + cladding sheet (mm) | Heating temperature of slab (°C.) | Finishing temperature of hot-rolling (°C.) |
|---|---|---|---|---|---|---|
| Clad steel plate for comparison | 1 | A | a | 27 + 3 | 1,050 | 840 |
| Clad steel plate for comparison | 2 | A | a | 27 + 3 | 1,050 | 840 |
| Clad steel plate of the invention | 3 | A | a | 27 + 3 | 1,050 | 840 |
| Clad steel plate for comparison | 4 | A | b | 23 + 2 | 1,200 | 780 |
| Clad steel plate of the invention | 5 | A | b | 23 + 2 | 1,200 | 880 |
| Clad steel plate for comparison | 6 | B | a | 27 + 3 | 1,200 | 860 |
| Clad steel plate of the invention | 7 | C | d | 13 + 3 | 1,150 | 880 |
| Clad steel plate for comparison | 8 | C | d | 13 + 3 | 1,150 | 750 |
| Clad steel plate of the invention | 9 | D | e | 15 + 3 | 1,150 | 880 |
| | 10 | D | f | 15 + 3 | 1,150 | 880 |
| | 11 | E | c | 46 + 4 | 1,250 | 900 |
| | 12 | E | d | 46 + 4 | 1,250 | 900 |
| Clad steel plate for comparison | 13 | F | d | 46 + 4 | 1,250 | 900 |
| Clad steel plate of the invention | 14 | G | g | 46 + 4 | 1,280 | 920 |
| | 15 | G | h | 46 + 4 | 1,280 | 920 |

| | No. | Cooling after hot-rolling (cooling rate) | Heat treatment following cooling after hot-rolling (cooling rate) |
|---|---|---|---|
| Clad steel plate for comparison | 1 | Left to cool in air up to room temp. | — |
| | 2 | Cooled up to 600° C. (2° C./sec.) | — |
| Clad steel plate of the invention | 3 | Cooled up to room temp. (2° C./sec.) | — |
| Clad steel plate for comparison | 4 | Cooled up to room temp. (4° C./sec.) | — |
| Clad steel plate of the invention | 5 | Cooled up to 430° C. (4° C./sec.) | — |
| Clad steel plate for comparison | 6 | Left to cool in air up to room temp. | Heated to 910° C. for 20 min., then left to cool in air up to room temp. |
| Clad steel plate of the invention | 7 | Cooled up to 400° C. (60° C./sec.) | — |
| Clad steel plate for comparison | 8 | Left to cool in air up to room temp. | — |
| Clad steel plate of the invention | 9 | Cooled up to 400° C. (60° C./sec.) | — |
| | 10 | Cooled up to room temp. (60° C./sec.) | — |
| | 11 | Cooled up to room | Heated to 630° C. for 15 min., then |

TABLE 3-continued

|  | | temp. (3° C./sec.) | cooled up to room temp. (0.2° C./sec.) |
|---|---|---|---|
|  | 12 | Same as above | Same as above |
| Clad steel plate for comparison | 13 | Same as above | Heated to 900° C. for 20 min., then cooled up to room temp. (3° C./sec.), then heated to 630° C. for 15 min., then cooled up to room temp. (0.2° C./sec.) |
| Clad steel plate of the invention | 14 | Same as above | Heated to 720° C. for 2 hr. then cooled up to room temp. (0.3° C./sec.) |
|  | 15 | Same as above | Same as above |

Test pieces were cut from each of the cald steel plates of the present invention Nos. 3, 5, 7, 9, 10, 11, 12, 14 and 15, and the clad steel plates for comparison Nos. 1, 2, 4, 6, 8 and 13, and these test pieces were subjected to tests to investigate mechanical properties and corrosion resistance. The items of tests and the results of these tests are shown in Table 4.

temperature of 50° C. for the period of one week in accordance with JIS Z-2371.

As shown in Table 3, each of the clad steel plates of the present invention Nos. 3 and 5 and the clad steel plates for comparison Nos. 1, 2 and 4 has the substrate sheet A of carbon steel. Among these clad steel plates, the clad steel plates of the present invention Nos. 3 and

TABLE 4

|  | No. | Tensile test | | | Impact test | Corrosion resistance test |
|---|---|---|---|---|---|---|
|  |  | Yield strength (Kgf/mm$^2$) | Tensile strength (Kgf/mm$^2$) | Elongation (%) | vTs (°C.) | Oxalic acid etching test or Salt spray test |
| Clad steel plate for comparison | 1 | 24.6 | 47.7 | 36 | −32 | Groove-shaped etched structure observed |
|  | 2 | 35.7 | 49.3 | 37 | −36 | Step-shaped etched structure observed |
| Clad steel plate of the invention | 3 | 43.3 | 57.2 | 40 | −25 | Same as above |
| Clad steel plate for comparison | 4 | 42.1 | 56.8 | 38 | −31 | Mixed etched structure observed |
| Clad steel plate of the invention | 5 | 41.2 | 54.9 | 38 | −29 | Step-shaped etched structure observed |
| Clad steel plate for comparison | 6 | 38.4 | 53.9 | 39 | −42 | Groove-shaped etched structure observed |
| Clad steel plate of the invention | 7 | 54.3 | 66.2 | 34 | −78 | No precipitate observed* |
| Clad steel plate for comparison | 8 | 51.9 | 62.3 | 36 | −88 | Precipitate observed** |
| Clad steel plate of the invention | 9 | 47.1 | 58.8 | 38 | −63 | No precipitate observed* |
|  | 10 | 48.8 | 59.7 | 40 | −72 | Same as above |
|  | 11 | 80.5 | 85.2 | 40 | −88 | Groove-shaped etched structure observed |
|  | 12 | 81.2 | 86.3 | 38 | −86 | No precipitate observed* |
| Clad steel plate for comparison | 13 | 76.4 | 82.5 | 42 | −79 | Precipitate observed** |
| Clad steel plate of the invention | 14 | 47.8 | 58.3 | 30 | −98 | No rust observed |
|  | 15 | 48.3 | 59.1 | 28 | −102 | Same as above |

*indicates the etched structure corresponding to the step-shaped structure; and
**indicates the etched structure corresponding to the groove-shaped structure.

The test pieces for the tensile test for investigating strength had dimensions as specified in JIS Z-2201 for Test Piece No. 5. The test pieces for the impact test for investigating toughness were sampled from the center portions in the thickness direction of the substrate sheets of the respective clad steel plates. The test pieces for the impact test had dimensions as specified in JIS Z-2202 for Test Piece No. 4. The test pieces for the oxalic acid etching test for investigating corrosion resistance were sampled from the cladding sheets of the respective clad steel plates and the test was conducted in conformity to JIS G-0571. Among the marks indicating the results of the oxalic acid etching test shown in Table 4, those with "*" indicate that the etched structure of the cladding sheet corresponds to the step-shaped structure, and those with "**" indicate that the etched structure of the cladding sheet corresponds to the groove-shaped structure. Since the oxalic acid etching test was not suitable to the clad steel plates of the present invention Nos. 14 and 15 because of their materials, these clad steel plates were subjected to the salt spray test with 5% NaCl solution of pH 5 having a 5, and the clad steel plates for comparison No. 2 cooled after the hot-rolling at a cooling rate of 2° C. per second and the clad steel plate for comparison No. 4 cooled after the hot-rolling at a cooling rate of 4° C. per second, both within the scope of the present invention, have a higher yield strength and tensile strength than those of the clad steel plate for comparison No. 1 cooled after the hot-rolling at a cooling rate of 0.5° C. per second which is lower than and outside the scope of the present invention, as shown in Table 4. However, while, in the clad steel plate for comparison No. 2, the cooling is conducted only up to 600° C. which is higher than and outside the scope of the present invention, in the clad steel plate of the present invention No. 3, the cooling is conducted up to the room temperature which is within the scope of the present invention, and in the clad steel plate of the present invention No. 5, the cooling is performed up to 430° C. which is within the scope of the present invention. Yield strength and tensile strength of the clad steel plates of the present invention Nos. 3 and 5 are, therefore, higher than those of the clad steel plate for comparison No. 2, as shown in Table 4.

On the other hand, in the clad steel plate for comparison No. 4, since the cooling is conducted up to the room temperature, which is within the scope of the present invention, yield strength and tensile strength thereof are high with a value almost on the same level as those of the clad steel plates of the present invention Nos. 3 and 5, as shown in Table 4. However, in the clad steel plate for comparison No. 4, since the hot-rolling is conducted at a finishing temperature of 780° C. which is lower than and outside the scope of the present invention, the etched structure of the cladding sheet thereof in the oxalic acid etching test presents a mixed structure, suggesting a low corrosion resistance of the cladding sheet, as shown in Table 4. In the clad steel plates of the present invention Nos. 3 and 5, the etched structure of the cladding sheet thereof in the oxalic acid etching test presents a stepped structure, suggesting a high corrosion resistance of the cladding sheet. Furthermore, the clad steel plate of the present invention No. 3 shows a better corrosion resistance of the cladding sheet than in the clad steel plate for comparison No. 4, as shown in Table 4, although the clad steel plate of the present invention No. 3 has a cladding sheet "a" comprising SUS304 stainless steel having a lower corrosion resistance than the cladding sheet "b" comprising SUS304L stainless steel of the clad steel plate for comparison No. 4.

The clad steel plate for comparison No. 6 has a substrate sheet "B" comprising carbon steel having a higher carbon content and a higher strength than carbon steel of the substrate sheet "A", and is subjected to a heat treatment, as the heat treatment following cooling after the hot-rolling, comprising heating the clad steel plate for 20 minutes to a temperature of 910° C. higher than $A_{cl}$ point of the substrate sheet thereof, and then leaving same to cool in the open air, which is outside the scope of the present invention. Cooling after the hot-rolling is conducted by leaving to cool in the open air, which is outside the scope of the present invention. Although each of the clad steel plates of the present invention Nos. 3 and 5 has a substrate sheet "A" which has a lower strength than that of the substrate sheet "B" of the clad steel plate for comparison No. 6, each of the clad steel plates of the present invention Nos. 3 and 5 has strength higher than that of the clad steel plate for comparison No. 6.

Each of the clad steel plate of the present invention No. 7 and the clad steel plate for comparison No. 8 has a substrate sheet "C" comprising Cu-Ni-Nb-V low-alloy steel and a cladding sheet "d" comprising SUS329J1 stainless steel. However, in the clad steel plate for comparison No. 8, the hot-rolling is conducted at a finishing temperature of 750° C., which is lower than and outside the scope of the present invention, and cooling after the hot-rolling is conducted by leaving to cool in the open air up to the room temperature, which is outside the scope of the present invention, thus resulting in a decreased yield strength and tensile strength of the substrate sheet thereof as compared with those of the clad steel plate of the present invention No. 7. In addition to the above, in the clad steel plate for comparison No. 8, the etched structure of the cladding sheet thereof in the oxalic acid etching test presents a groove-shaped structure, suggesting a low corrosion resistance of the cladding sheet, as shown in Table 4. In the clad steel plate of the present invention No. 7, in contrast, the hot-rolling is conducted at a finishing temperature of 880° C., which is within the scope of the present invention, and cooling after the hot-rolling is conducted at a cooling rate of 60° C. per second until the temperature of the clad steel plate becomes 400° C., which is within the scope of the present invention, thus resulting in a higher yield strength and tensile strength of the substrate sheet thereof as compared with those of the clad steel plate for comparison No. 8. In addition to the above, in the clad steel plate of the present invention No. 7, the etched structure of the cladding sheet thereof in the oxalic acid etching test presents a step-shaped structure, suggesting a high corrosion resistance of the cladding sheet, as shown in Table 4.

In the clad steel plates of the present invention Nos. 11 and 12 and the clad steel plate for comparison No. 13, the hot-rolling is conducted at a finishing temperature of 900° C. which is within the scope of the present invention, and cooling after the hot-rolling is conducted up to the room temperature at a cooling rate of 3° C. per second which is within the range of the present invention. In addition to the above, these clad steel plates are subjected, following cooling after the hot-rolling, to a heat treatment for improving toughness of the cladding sheet comprising heating for 15 minutes at a temperature of from 500° C. to under $A_{cl}$ point of the substrate sheet, i.e., 630° C., which is within the scope of the present invention, and then cooling at a cooling rate of 0.2° C. per second which is within the scope of the present invention. However, the clad steel plate for comparison No. 13 is subjected, prior to the above-mentioned cooling after the hot-rolling, to a hardening treatment comprising heating for 20 minutes at a temperature of 900° C. above $A_{cl}$ point of the substrate sheet, which is outside the scope of the present invention, and then, cooling at a cooling rate of 3° C. per second, thus leading to deterioration of strength of the substrate sheet. As a result, the clad steel plate for comparison No. 13 has yield strength and tensile strength of the substrate sheet lower than those of the clad steel plates of the present invention Nos. 11 and 12, in spite of the fact that the clad steel plate for comparison No. 13 has the substrate sheet "F" comprising low-alloy steel which has higher contents of alloy elements and a higher strength than the substrate sheet "E" comprising low-alloy steel of the clad steel plates of the present invention Nos. 11 and 12. Furthermore, in the clad steel plate for comparison No. 13, the etched structure of the cladding sheet thereof in the oxalic acid etching test presents a groove-shaped structure, suggesting a low corrosion resistance of the cladding sheet, as shown in Table 4. On the contrary, in the clad steel plates of the present invention Nos. 11 and 12 which are subjected, following cooling after the hot-rolling, only to the heat treatment for improving toughness of the substrate sheet, which is within the scope of the present invention, toughness of the substrate sheet thereof is improved with the slightest decrease in strength of the substrate sheet and in corrosion resistance of the cladding sheet.

Also in the clad steel plates of the present invention Nos. 9 and 10, cooling after the hot-rolling brings about a high yield strength and tensile strength of the substrate sheet, and leads to an improved corrosion resistance of the cladding sheet. In the clad steel plates of the present invention Nos. 14 and 15, the heat treatment for improving toughness following cooling after the hot-rolling permits improvement of toughness of the substrate sheet while minimizing decrease in strength of the substrate sheet and in corrosion resistance of the cladding sheet.

According to the present invention, as described above in detail, it is possible to manufacture a high-strength clad steel plate excellent in corrosion resistance, in which a cladding sheet has a high corrosion resistance and a substrate sheet has a high strength.

What is claimed is:

1. An improved method for manufacturing a high-strength clad steel plate excellent in corrosion resistance, which comprises the steps of:
   placing a cladding sheet comprising stainles steel onto at least one of the surfaces of a substrate sheet comprising any one of carbon steel and low-alloy steel; welding together the peripheries of said substrate sheet and said cladding sheet to prepare a slab; heating said prepared slab to a temperature within the range of from 1,050° to 1,300° C.; hot-rolling said heated slab at a finishing temperature of at least 800° C. to pressure-weld said substrate sheet and said cladding sheet together to obtain a clad steel plate comprising said substrate sheet and said cladding sheet; and cooling said clad steel plate; the improvement comprising
   said cooling of said clad steel plate is carried out at a cooling rate of from 2° to 60° C. per second until the temperature of said clad steel plate is less than 450° C.

2. The method as claimed in claim 1, wherein
   said clad steel plate is subjected, following said cooling, to a heat treatment which comprises heating said clad steel plate to a temperature of at least 500° C. and under the $A_{cl}$ point of said substrate sheet, and then cooling said heated clad steel plate at a cooling rate of from 0.2° to 60° C. per second until the temperature of said clad steel plate reaches room temperature, thereby improving the toughness of said substrate sheet.

3. A method for manufacturing simultaneously two high-strength clad steel plates excellent in corrosion resistance, which comprises the steps of:
   placing a first cladding sheet comprising stainless steel onto a first substrate sheet comprising any one of carbon steel and low-alloy steel; applying a peeloff material onto the upper surface of said first cladding sheet; placing a second cladding sheet comprising stainless steel onto said first cladding sheet through said peeloff material therebetween; placing a second substrate sheet comprising any one of carbon steel and low-alloy steel onto said second cladding sheet; welding together the peripheries of said first substrate sheet and second substrate sheet through spacers to prepare a slab; heating said prepared slab to a temperature within the range of from 1,050° to 1,300° C.; hot-rolling said heated slab at a finishing temperature of at least 800° C. to pressure-weld said first substrate sheet and said first cladding sheet together, and simultaneously pressure-weld said second substrate sheet and said second cladding sheet together, to obtain simultaneously a first clad steel plate comprising said first substrate sheet and said first cladding sheet, and a second clad steel plate comprising said second substrate sheet and said second cladding sheet; cooling simultaneously said first clad steel plate and said second clad steel plate; and separating said first clad steel plate and said second clad steel plate from an interface applied with said peeloff material;
   said cooling of said first clad steel plate and said second clad steel plate is carried out at a cooling rate of from 2° to 60° C. per second until the temperatures of said first clad steel plate and said second clad steel plate is less than 450° C.

4. The method as claimed in claim 3, wherein
   said first and second clad steel plates are subjected, following said cooling, to a heat treatment which comprises heating said first and second clad steel plates to a temperature of at least 500° C. and under $A_{cl}$ point of said first and second substrate sheets, and then cooling said heated first and second clad steel plates at a cooling rate of from 0.2° to 60° C. per second until the temperatures of said first and second clad steel plates reach room temperature, thereby improving the toughness of said first and second substrate sheets.

5. The method as claimed in claim 1, wherein said cooling of said clad steel plate carried out at a cooling rate of from 2° to 60° C. per second is carried out by cooling with water.

6. The method as claimed in claim 2, wherein said cooling of said clad steel plate carried out at a cooling rate of from 2° to 60° C. per second is carried out by cooling with water.

7. The method as claimed in claim 3, wherein said cooling of said clad steel plate carried out at a cooling rate of from 2° to 60° C. per second is carried out by cooling with water.

8. The method as claimed in claim 4, wherein said cooling of said clad steel plate carried out at a cooling rate of from 2° to 60° C. per second is carried out by cooling with water.

* * * * *